United States Patent [19]

Engels et al.

[11] Patent Number: 4,770,603

[45] Date of Patent: Sep. 13, 1988

[54] EXHAUST GAS TURBOCHARGER

[75] Inventors: Bertold Engels, Weisenheim/Sand; Hans-Josef Hemer, Worms; Robert Lingenauber, Frankenthal, all of Fed. Rep. of Germany

[73] Assignee: Aktiengesellschaft Kuhnle, Kopp & Kausch, Frankenthal, Fed. Rep. of Germany

[21] Appl. No.: 932,012

[22] Filed: Nov. 18, 1986

[30] Foreign Application Priority Data

Nov. 23, 1985 [DE] Fed. Rep. of Germany ....... 3541508

[51] Int. Cl.$^4$ .............................................. F01D 17/16
[52] U.S. Cl. .................................... 415/147; 415/164
[58] Field of Search ............... 415/150, 148, 159, 162, 415/163, 164, 165, 166, 147, 160, 161

[56] References Cited

U.S. PATENT DOCUMENTS

| 3,645,645 | 2/1972 | Gammill et al. ..................... 415/117 |
| 3,957,392 | 5/1976 | Blackburn . |
| 4,107,927 | 8/1978 | Gordon Jr. et al. . |
| 4,179,247 | 12/1979 | Osborn . |
| 4,403,913 | 9/1983 | Fisker . |
| 4,654,941 | 4/1987 | Burdette et al. ............... 29/156.8 R |
| 4,657,480 | 4/1987 | Pfeil . |
| 4,702,672 | 10/1987 | Leicht et al. . |

FOREIGN PATENT DOCUMENTS

| 0204033 | 12/1986 | European Pat. Off. . |
| 964551 | 5/1957 | Fed. Rep. of Germany . |
| 1071420 | 12/1959 | Fed. Rep. of Germany . |
| 3235538 | 3/1984 | Fed. Rep. of Germany . |
| 3325756 | 9/1984 | Fed. Rep. of Germany . |
| 3516738 | 11/1986 | Fed. Rep. of Germany . |
| 304638 | 2/1929 | United Kingdom . |

Primary Examiner—Henry Bennett
Attorney, Agent, or Firm—Foley & Lardner, Schwartz, Jeffery, Schwaab, Mack, Blumenthal & Evans

[57] ABSTRACT

An exhaust gas turbocharger comprising a turbine with a guide apparatus comprising a ring of guide vanes arranged concentrically around a rotor axis and pivotable between two end limits. A first securing ring is arranged at the side of a bearing housing for mounting a first trunnion of each guide vane which is also mounted at the side of an oppositely disposed turbine housing. An adjusting mechanism is provided for adjusting one of the two end limits, and the guide vanes are freely pivotable under the influence of flow forces in the resulting predetemined angle adjustment range. The arrangement makes possible a compact construction which can be fabricated at reduced cost and easily assembled. This is achieved by an assembly containing the guide apparatus and the adjusting mechanism, and which includes a second securing ring arranged at the side of a turbine housing for mounting a second trunnion of each guide vane. The assembly has an inner diameter which is larger than the outer diameter of the turbine wheel, and the two securing rings are connected to each other in axially spaced relation by connecting elements to form a flow channel in which the guide vanes are disposed.

23 Claims, 4 Drawing Sheets

EXHAUST GAS TURBOCHARGER

BACKGROUND OF THE INVENTION

This invention relates to a turbine, particularly for an exhaust gas turbocharger, having a guide apparatus with a ring of guide vanes that are arranged concentrically around a rotor axis and that are each pivotable between two end limits, which comprises a first securing ring arranged at the side of a bearing housing, in which the guide vanes are each mounted by means of a first trunnion, and in which the guide vanes are each mounted with a second trunnion at the side of a turbine housing, and having an adjusting mechanism for adjusting one of the end limits, wherein the guide vanes are freely pivotable under the influence of flow forces in an angle adjustment range determined by the end limits, and wherein the guide apparatus and the adjusting mechanism form a single subassembly or unit assembly.

West German Patent No. DE-PS 33 25 756 (equivalent to U.S. Pat. No. 4,657,480) describes an exhaust gas turbocharger with guide vanes which are freely pivotable under the influence of flow forces within an angle adjusting range determined by means of end limits. In order to adjust one of the end limits, an adjusting ring is provided which forms a portion of the wall of the flow channel and which has saw tooth form contact surfaces for the free ends of the guide vanes. Within the limits determined in this manner, an automatic adjustment of the guide vanes occurs in accordance with the flow in the partial load range in order to reduce gap losses and impact losses. When the load is increased, the guide vanes position themselves at the largest possible open angle permitted by the position of the end limit. The setting of the end limit takes place in accordance with the charge pressure characteristic. Fabrication and assembly require an expenditure which is not insubstantial. First the guide vanes must be individually inserted with their trunnions in corresponding bore holes in the turbine housing. Only thereafter can the assembly be attached to the turbine housing.

U.S. Pat. No. 4,403,913 discloses an outlet guide apparatus of a compressor in which the air from a compressor wheel is conveyed radially outwardly through the guide apparatus in a spiral diffuser. The guide vanes of the guide apparatus are each mounted at only one side. This technique of mounting the guide vanes can be used in a compressor, since in comparison with an exhaust gas turbine, significantly smaller mechanical and thermal stresses are encountered. A guide apparatus for the turbine of an exhaust gas turbocharger requires two sided mounting of the guide vanes.

U.S. Pat. No. 4,179,247 describes a turbocharger having an adjusting mechanism for the guide vanes. The guide vanes are forcibly guided, and the adjusting mechanism contains a large number of individual component parts which require an expensive construction and a high assembly cost. There exists a danger of disturbances, especially since, due to the high operating temperature, binding and/or displacement or distortion is very difficult to avoid in practice. The adjusting mechanism requires a relatively large amount of space; cooling channels cannot be provided in this region which is subjected to the hot exhaust gases. Further, difficulties arise with regard to achieving a secure sealing of the vane shafts which extend outwardly from the flow channel.

SUMMARY OF THE INVENTION

It is the object of the invention to provide an improved exhaust gas turbocharger turbine.

It is also an object of the invention to provide an exhaust gas turbocharger turbine which has a simple and space saving construction.

Another object of the invention is to provide an exhaust gas turbocharger turbine in which reliable and accurate adjustment of one of the end limits for the guide vanes is possible.

A further object of the invention is to provide an exhaust gas turbocharger turbine with an adjusting mechanism which is inexpensive.

A particular object of the invention is to provide an exhaust gas turbocharger turbine which does not need a large construction volume, especially in the direction of the shaft.

A still further object of the invention is to provide an exhaust gas turbocharger turbine which can be simply assembled at low production cost.

Yet another object of the invention is to provide an exhaust gas turbocharger turbine which can be assembled by automated equipment.

Additionally it is an object of the invention to provide an exhaust gas turbocharger turbine which has a compact and weight saving construction.

Another object of the invention is to provide an exhaust gas turbocharger turbine with a high degree of functional reliability.

An additional object of the invention is to provide an exhaust gas turbocharger turbine composed of only a few parts of robust construction which assures a high degree of operational reliability.

Still another object of the invention is to provide an exhaust gas turbocharger turbine which is adaptable to operating requirements and construction conditions.

These and other objects of the invention are achieved by providing a turbine for an exhaust gas turbocharger including a turbine wheel and a guide apparatus, in which the guide apparatus comprises an assembly of a ring of guide vanes arranged concentrically around a rotor axis, each guide vane having first and second trunnions and being freely pivotable under the influence of flow forces in an angle adjustment range defined by two end limits; a first securing ring disposed at the side of a bearing housing in which said guide vanes are each pivotably mounted by means of the first trunnion; a second securing ring disposed at the side of a turbine housing in which said guide vanes are each pivotably mounted by means of the second trunnion; and an adjusting mechanism for adjusting one of the end limits; in which the assembly has an inner diameter which is larger than the outer diameter of the turbine wheel, and in which the first and second securing rings are connected in axially spaced relation to each other by connecting elements to form a flow channel between them with the guide vanes disposed therein.

According to a particularly preferred embodiment of the invention the objects are achieved by providing a turbine of the aforedescribed type in which the assembly comprises a support ring fixedly attached to the first securing ring, and the adjusting mechanism comprises an adjusting ring mounted on the support ring.

According to the invention, the assembly includes a second securing ring which is associated with the turbine housing and which serves to receive the second trunnion of each of the guide vanes. The assembly further has an inner diameter which is larger than the outer diameter of the turbine wheel, and the two securing rings are connected to each other in axially spaced relation by means of connecting elements to form the flow channel as well as receive the guide vanes.

The exhaust gas turbocharger of the invention is distinguished by a simple and functionally effective construction, whereby the assembly, including the guide vanes, can be completely preassembled. During assembly of the turbocharger, the prefabricated subassembly can be attached without difficulty to the turbine housing or the bearing housing. The guide vanes are completely integrated into the assembly by the second securing ring, and they do not need to be individually inserted with their trunnions in the turbine housing during the putting together of the assembly and the turbine housing. The securing rings serve to mount the guide vanes and are directly connected to each other by means of connecting elements. Despite large thermal expansion in the flow channel region, narrow tolerances can be maintained, whereby the degree of operability can be improved. The two securing rings can be positioned very exactly with respect to each other in the assembly so that the gaps between the guide vanes and the securing rings which form the side walls of the flow channel can be kept small to achieve a defined flow in the guide apparatus. Further, since the two securing rings have substantially the same thermal characteristics, and advantageously consist of the same material and have approximately the same size, there is no need to fear that the guide vanes will bind in fixed position, even when rapid temperature changes occur. A high degree of functional reliability is achieved. Because the completely preassembled assembly has an inner diameter which is larger than the outer diameter of the turbine wheel, the attachment of the assembly to the turbine housing can take place first during manufacture in order that the assembly and the turbine housing together can be pushed onto the bearing housing which is likewise prefabricated and preassembled including the turbine wheel. This results in advantages in mass production, particularly with regard to fabrication by means of automated devices. Because of the low space requirement, cooling channels, which are above all of particular importance in the high temperature region, can be provided in the bearing housing. The assembly, i.e. the rings, may have a comparatively large inner diameter so that the cooling channels can be arranged in a radially inward position in the bearing housing. The attachment of the bearing housing and the turbine housing may be effected through the assembly, whereby the desired angle setting in accordance with the construction requirements of the exhaust gas turbocharger can be predetermined without any problem.

In one particular embodiment, the securing ring and the support ring are fixedly attached, preferably by means of screws, and the adjusting ring is arranged at least partially between these rings. Relatively simple constructed components are integrated into the assembly, whereby the securing ring provided for securing and mounting the guide vanes simultaneously also serves to axially receive the adjusting ring. It should be expressly mentioned at this point that within the scope of the invention the securing ring and particularly the adjusting ring and/or the support ring can optionally also be formed as segments which are connected to each other in suitable fashion. The significant thing with regard to low fabrication costs is the simple geometry of these rings or segments. The adjusting ring and the two securing rings are formed of a high temperature resistant material and can within the scope of the invention also be fabricated of ceramic material. The compact and robust construction of the rings makes fabrication from ceramic material possible. The rings should each lie with their axial end faces against each other, i.e. they should be supported by each other, whereby good workability is assured. Insofar the functionally appropriate sealing of the individual rings of the assembly as well as their sealing with respect to the bearing housing and turbine housing is also significant. In accordance with the invention the assembly is attached to the turbine housing or to the bearing housing by means of pressure rings and screws or the like.

In one important embodiment a portion of the bearing housing is arranged with a cooling channel within the assembly. Due to the simple and robust construction of the assembly, it has only a small space requirement, so that the internal diameter may be suitably large with respect to the turbine wheel on the one hand and to the cooling channel of the bearing housing on the other hand. A high operational reliability is assured. It is further significant that the assembly, and particularly a bracket and/or the adjusting motor which is integrated into the assembly, can be disposed in any desired angular position around the rotor shaft from 0° to 360° with regard to the bearing housing and/or the turbine housing. An accommodation to the prevailing installation requirements in the engine compartment of a motor vehicle can thereby be achieved in an extraordinarily simple manner. Depending on the motor construction, the adjusting motor can thus be rotated to the most favorable position, without any particular modification of the exhaust gas turbocharger being required therefor. In accordance with the invention, the bracket for attaching the adjusting motor is an integral component of the assembly, and particularly of its support ring.

In one particularly significant embodiment, the assembly comprises two securing rings for the guide vanes, whereby the securing ring associated with the turbine housing is mounted in such a way so as to be free of contact with the turbine housing. The securing ring associated with the turbine housing borders on the flow channel and simultaneously forms a wall of the flow channel. Because of the contact-free arrangement with respect to the turbine housing, thermal expansion and/or distortion may be compensated for without any problem. A functionally appropriate and simple fabrication is possible because the guide vanes are integrated into the assembly according to the invention just as the securing rings are. Thus, during manufacture, the guide vanes do not need to be individually inserted into the turbine housing or appropriate component parts thereof.

In one significant embodiment of the invention, the adjusting mechanism comprises at least one lever which is coupled to the adjusting ring through a slide lever or drag lever. This slide lever or coupling lever assures a reliable adjustment with a simple construction without any fear of binding in fixed position. The adjusting mechanism comprises only a few parts and the parts have a robust construction so that functional disturbances due to thermal expansion or distortion are avoided. According to the invention the shaft on which the lever is pivotably mounted is arranged parallel to the rotor axis and/or the slide lever is arranged in a recess in the adjusting ring and pivotably connected there to the adjusting ring. The adjusting mechanism thus contains as significant component parts the lever arranged to pivot around the shaft as well as the slide lever connected to the adjusting ring. The connection to the adjusting motor takes place in accordance with the invention through a further lever which is connected in rotationally fixed fashion to the shaft or to the first-mentioned lever. This further lever is connected to the adjusting motor, in particular by means of a pitmann rod.

The adjusting ring is radially as well as axially supported in the assembly, in particular on the support ring of the assembly, by means of a roller bearing or alternatively by means of a slide bearing. Within the scope of the invention, the bearing surfaces, and particularly those of a slide bearing, are provided with a high surface hardness. This can be achieved in accordance with the invention by means of a special coating, and particularly by means of a coating of titanium nitride. If the support ring as well as the adjusting ring are formed in accordance with the invention of ceramic material, then the surface hardness will be determined by the selection of the material itself. As a result of the high surface hardness, dirt particles from the turbine are reliably prevented from seating themselves in the bearing surfaces and causing functional disturbances. The surface hardness should be selected such that expected dirt particles are crushed or pulverized between the bearing surfaces.

BRIEF DESCRIPTION OF THE DRAWINGS

The invention will be explained in further detail hereinafter with reference to a preferred working embodiment illustrated in the drawings in which.

DETAILED DESCRIPTION OF PREFERRED EMBODIMENTS

Figure 1:
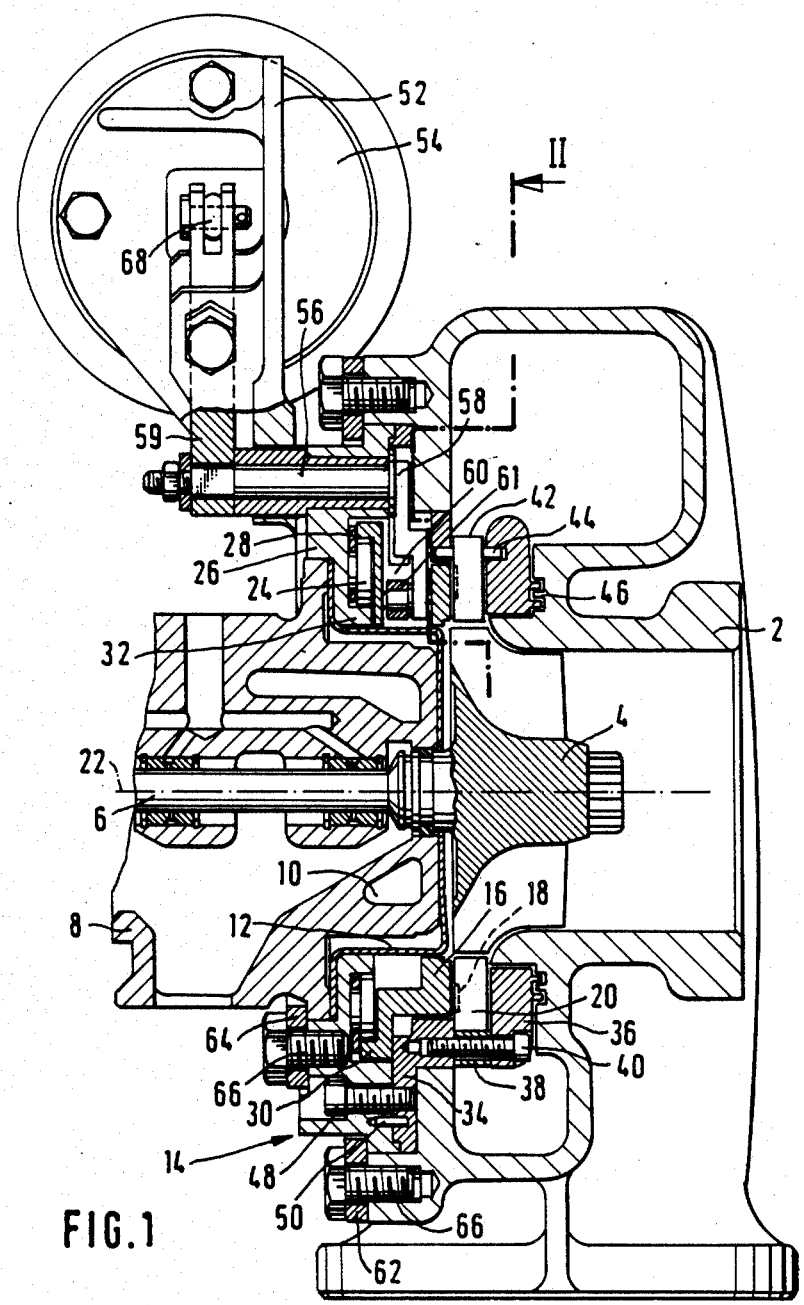
FIG. 1 shows a longitudinal axial section through the turbine and a portion of bearing housing of an exhaust gas turbocharger.

FIG. 1 shows a turbine housing 2 in the interior of which there is a turbine wheel 4 which is connected in a known fashion with a shaft 6 and by means of this shaft is mounted in a bearing housing 8. Bearing housing 8 contains a cooling channel 10 through which a cooling fluid, particularly water, is passed. By means of a pan shaped body of sheet metal or heat shield 12, the bearing housing 8 is shielded with respect to turbine housing 2 through which hot exhaust gases flow.

Between the turbine housing 2 and the bearing housing 8 there is arranged an assembly 14 which is formed as a substantially annular cartridge. Assembly 14 contains an adjusting ring 16 with projections 18 which extend into the flow channel. These projections 18 are formed with a saw tooth form or profile as viewed in the circumferential direction, and they contain the contact surfaces, whereby one projection is associated with each one of the guide vanes 20. Adjusting ring 16 is rotatable within assembly 14 with respect to the rotor axis 22 in such a way that in accordance therewith the one end limit, and thus the adjustment angle range, for the guide vanes 20 is determined by the position of projections 18.

Adjusting ring 16 is rotatably mounted with respect to a support ring 26 by means of rollers 24. A number, for example four, such rollers 24 are distributed around the circumference, by means of which the adjusting ring is both axially as well as radially supported. The rollers 24 are held in the desired angular spacing around the circumference by means of a bearing cage provided with appropriate holding means 28. Adjusting ring 16 has a step-like cross section, whereby an axial appendage 30 serves to radially support the rollers 24. In a radially inward position the support ring 26 is provided with a coaxial band 32 for mountingly supporting the rollers 24. A pressure prevailing in the turbine exerts an axial force component on the adjusting ring 16 which is taken up by the support ring 26 through the axial end faces of the rollers 24. The assembly 14 including adjustment ring 16 and support ring 26 have altogether an inner diameter which is larger than the outer diameter of the turbine wheel 4. During manufacture, the assembly can therefore be pushed without any problem over the turbine wheel 4 onto the bearing housing 8. In addition it is significant that, because of the relatively large inner diameter of the assembly 14, the bearing housing can be provided with a cooling channel 10 which lies radially inwardly and which is of particular significance with respect to high temperature operation.

In an alternative embodiment, not illustrated here in further detail, the adjusting ring 16 may be mounted directly in the support ring 26 by a slide bearing. The above described rollers together with the bearing cage are omitted. The adjusting ring lies against the support ring in particular at the axial end faces as well as at the circumferential surface coaxial to the rotor axis. Further, within the scope of the invention, combined axial and radial bearings could also be provided. Also, the mounting could be provided with separate rollers, balls or general rolling bodies in order to transmit the axial forces on the one hand and to separately transmit the radial forces on the other hand. Thus, the above described rollers could be provided with a central bore in which a ball is arranged in each case, whereby, in accordance with the invention, the rollers assume only the radial mounting and the balls assume the axial mounting. Optionally, rollers for the radial forces and the axial forces can also be arranged distributed alternately over the circumference. It is desirable in all embodiments that the bearing surfaces of the adjusting ring and the support ring have a high surface hardness. Dirt particles from the turbine which may possibly reach the bearing region are pulverized due to the high surface hardness and consequently cannot seat themselves in the surfaces. A high degree of functional reliability and a long service life are thus assured.

The assembly 14 further contains first and second securing rings 34 and 36 for the guide vanes 20. The guide vanes 20 and the flow channel are located axially between the securing rings 34 and 36, whereby the axial spacing between the two securing rings is defined by means of spacer sleeves 38. The two securing rings 34 and 36 are connected to each other by a number of screws 40 distributed around the circumference which each extend through a spacer sleeve 38. The guide vanes 20 are pivotably mounted by means of trunnions 44 arranged adjacent the inflow edges 42 in corresponding axial bores in the securing rings 34 and 36. The width of the flow channel is defined in accordance with the invention by the spacer sleeves 38 in such a way that on the one hand the guide vanes 20 are freely pivotable and on the other hand the gaps between the axial end faces of the vanes and the two securing rings 34 and 36 are not too large.

Within the scope of the invention, the second securing ring 36 may be disposed without any contact with the turbine housing 2, whereby a reliable sealing between the parts is achieved by a labyrinth seal 46. For the labyrinth seal, the second securing ring 36 contains, for example, two coaxial rings which extend into corresponding annular grooves on the turbine housing. The contact-free arrangement of the securing ring 36 with respect to the turbine housing 2 assures in a reliable manner a compensation for thermal expansion or distortion, whereby within the scope of the invention, the comparatively small gaps are also maintained between the guide vanes and the securing rings 34 and 36, which simultaneously form the walls of the flow channel. Instead of the illustrated labyrinth seal, other one stage or multi stage labyrinth seal arrangements could also be provided, whereby particular reference may be made here to pointed labyrinth seals which are utilized, for example, in steam turbines. The guide vanes 20 are preassembled with the assembly 14 and then all attached together to the turbine housing in a single manufacturing step. As can be seen from FIG. 1, the second securing ring 36 is received in an annular recess in the wall of turbine housing 2, and the surface of second securing ring 36 facing the guide vanes 20 merges radially inwardly into a wall of the turbine housing, and the turbine housing wall curves toward a central turbine outlet opening.

The integration of the first securing ring 34 and of the oppositely disposed second securing ring 36, which in accordance with the invention forms the opposite wall of the flow channel, into a single assembly reliably prevents binding of the guide vanes 20 as a result of manufacturing stresses or the influence of heat. A high operational reliability is achieved by use of only a few, robust components. The significant component parts of the assembly 14, which all have simple geometry and which can be fabricated of ceramic material in accordance with the invention, viz., the adjusting ring 16, the support ring 26, and the two securing rings 34 and 36, are attached to each other in a simple manner by means of screws or similar connecting means, whereby mutual interpositioning is assured with exactitude by means of centering pins 50. The one adjusting ring 16 having a step-like cross section is assembled axially between the support ring 26 and the securing ring 34, whereby a sufficient axial play is provided that even at high temperatures binding is avoided.

The support ring 26 is provided with a bracket 52 on which a well known adjusting motor 54, not described here in further detail, is attached. The assembly 14 including the integrated bracket 52 for the adjusting motor 54 can, in order to accommodate the installation conditions, be attached to the bearing housing and/or the turbine housing in any desired angular orientation with respect thereto. The adjusting motor 54 is actuated, particularly in response to the load pressure, in order through the action of a shaft 56 and a lever 58 to bring the adjusting ring 16 into the desired angular position. The adjusting motor is operatively connected by a pitmann rod to a further lever 59 which is rotationally secured to the shaft 56. The shaft 56 lies parallel to the rotor axis 22 and is mounted in the support ring 26. Thus, via shaft 56, the rotational movement or adjusting movement is transmitted from outside into the assembly 14 to the adjusting ring 16. The adjusting ring 16 is provided with a recess 60 into which the lever 58 extends. Lever 58 is pivotally attached and operatively coupled to the adjusting ring 16 through a slide lever 61 which is disposed in the recess 60 in the adjusting ring. The assembly 14 is connected through a pressure ring 62 with the turbine housing 2 and through pressure segments 64 with the bearing housing 8. The pressure ring 62 and the pressure segments 64 are connected with the turbine housing 2 or the support ring 26, respectively, by means of screws 66 and extend over the appropriate mountings of the assembly 14 or the bearing housing 8, respectively.

Figure 2:
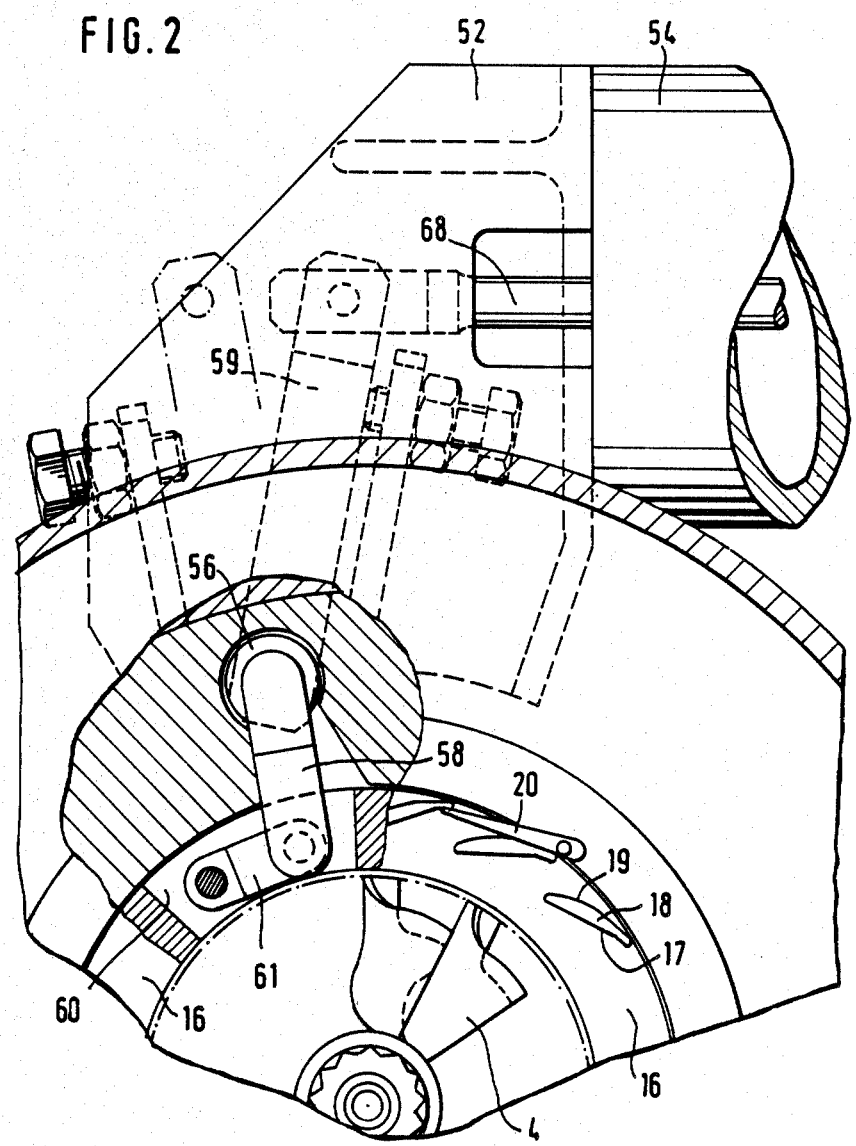
FIG. 2 shows an enlarged section or view along the line II of FIG. 1.

FIG. 2 shows in enlarged view, partially in section and partially in elevation, the significant components of the adjusting mechanism for bringing to pass the adjusting movement of the adjusting ring 16. The pitmann rod 68 of the adjusting motor 52 is shown to which a further lever 59 is pivotably connected. The mounting of the shaft 56 in the support ring represents a fixed bearing for the lever 59 which is fixed to shaft 56 to rotate therewith. The pivotable connection shown at the top of the drawing between lever 59 and pitmann rod 68 is thus movable along a circular path around the shaft 56 into the other end position which is shown in broken lines toward the left of the drawing. The pitmann rod 68 is movably guided in the adjusting motor or adjusting cylinder to this extent. The lever 58 which is arranged in axially spaced relation to lever 59 can be fabricated with shaft 56 as a single integral piece, or it can be fixedly attached to the shaft to rotate therewith. The two levers 58, 59 thus always have the same angular relation to each other. The drawing also shows in recess 60 the coupling piece or slide lever 61 through which the connection with the adjusting ring is achieved. Slide lever 61 is connected to the adjusting ring 16 by a pivot pin or the like.

For simplicity of illustration only one guide vane 20 is shown, which, like the other guide vanes, substantially blocks the flow channel. Guide vane 20 lies with its free end on the inner contact surface 17 of the specially configured projection 18 of adjusting ring 16. According to the invention, the inner contact surfaces 17 form the second end limit for the guide vanes 20. The first end limit is formed by the contact surfaces 19 which are arranged radially outwardly on the projections 18. In accordance with the invention, the range of angle adjustment for a given angular position of the adjusting ring 16 is determined by appropriately shaping and configuring the projections 18 including the inner contact surfaces 17 and outer contact surfaces 19. The second end limit is definitely defined by the inner contact surface 17, and contact or clamping between the free end of the guide vane and the adjacent guide vane is prevented.

Figure 3:
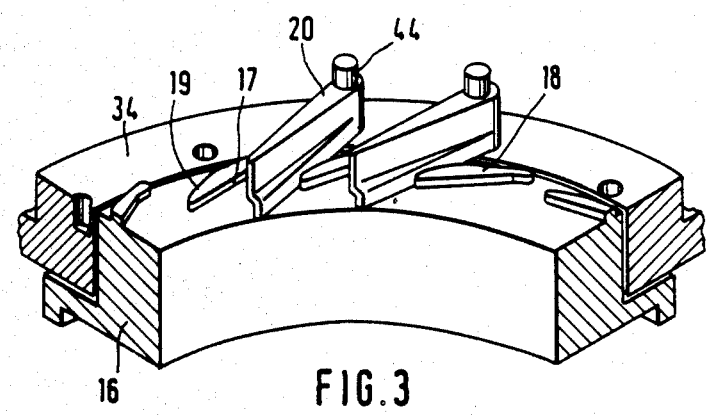
FIG. 3 shows an enlarged perspective partial view of the adjusting ring and the securing ring at the largest angle opening in the angle adjustment range.

FIG. 3 shows an enlarged, perspective partial view of the adjusting ring 16 and the first securing ring 34 with the blind bores for the mounting trunnions of the guide vanes 20. The adjusting ring 16 is shown in the angular position with respect to the securing ring 34 in which the guide vanes 20 practically completely open the flow channel. The shaped projections 18 also do not impede the free flow cross sectional area. The mounting trunnions 44 of the guide vanes 20 are bearingly received in corresponding blind bores in the second securing ring which, for reasons of clarity of illustration, is omitted from the drawing.

Figure 4:
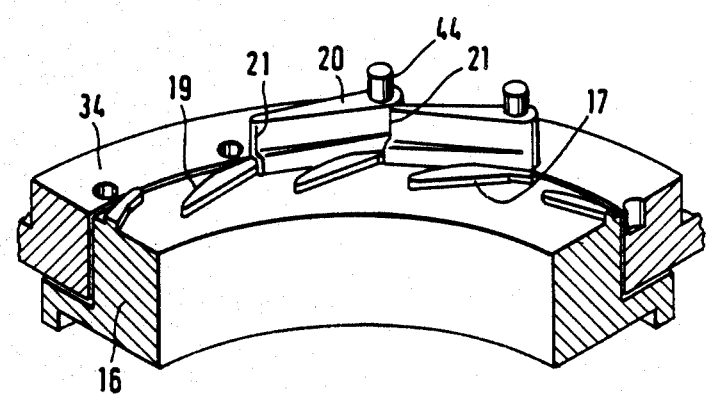
FIG. 4 shows a partial view similar to FIG. 3 in which the guide vanes block the flow channel.

FIG. 4 shows a perspective view similar to FIG. 3 in which, however, the adjusting ring 16 has been rotated with respect to the first securing ring 34 in such a manner that the flow cross sectional area is closed off by the guide vanes 20. In accordance with the invention, the guide rings are bent back radially inwardly at an angle on the longitudinal side 23 which faces or is oriented toward the adjusting ring 16. It is thereby assured that, on the one hand, the guide vanes 20 definitely engage the inner contact surface 17 of the associated projection 18, and, on the other hand, no gap will exist between the free end 21 and the next adjacent guide vane 20.

Figure 5:
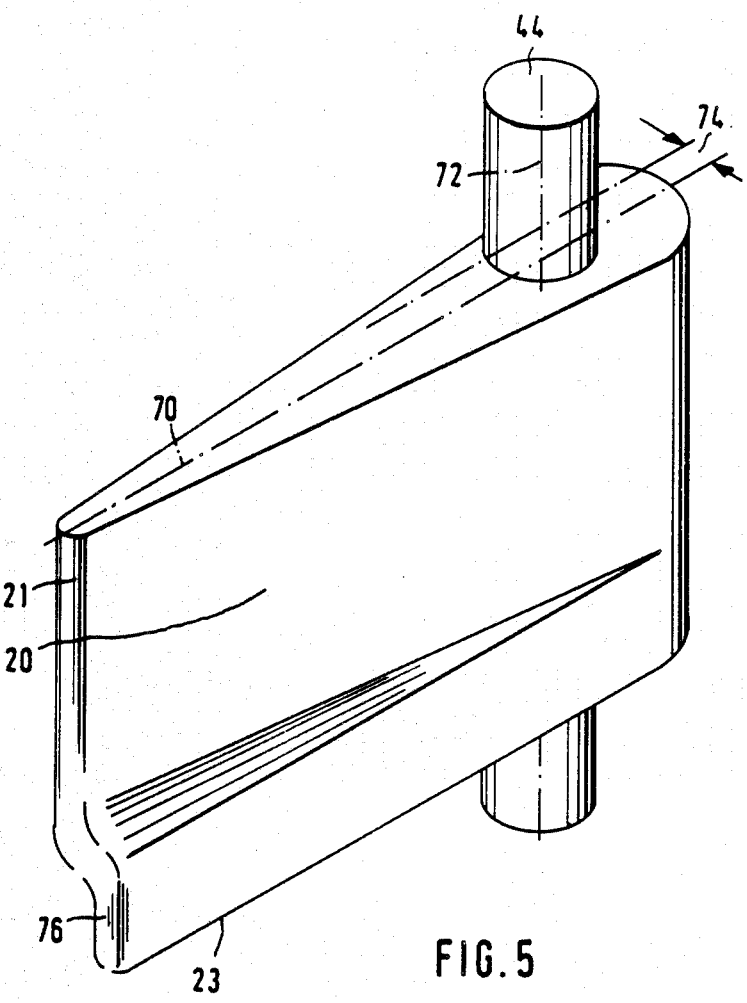
FIG. 5 shows an enlarged perspective view of a guide vane.

FIG. 5 shows an enlarged perspective view of one of the guide vanes 20. In this preferred embodiment the axis of rotation of the two trunnions 44 is displaced radially outwardly with respect to a central plane 70 by a distance 74. If the guide vane 20 lies in contact with the inner contact surface of the associated projection, then as a result of this outwardly displaced arrangement of the trunnions in accordance with the invention, the flow channel can be tightly closed. Further, this figure clearly shows along longitudinal edge 23 the portion of the guide vane 20 which is bent radially inwardly with respect to the central plane 70.

The foregoing description has been set forth merely to illustrate the invention and is not intended to be limiting. Since modifications of the described embodiments incorporating the spirit and substance of the invention may occur to persons skilled in the art, the scope of the invention is to be limited solely with respect to the appended claims and equivalents.

What is claimed is:

1. A turbine including a turbine wheel and a guide apparatus, said guide apparatus comprising a guide apparatus assembly of:
   a ring of guide vanes arranged concentrically around a turbine rotor axis, each guide vane having a first and a second trunnion and being freely pivotable under the influence of flow forces within an angle adjustment range defined by two end limits;
   a first securing ring disposed at the side of a turbine shaft bearing housing and in which said guide vanes are each pivotably mounted by means of said first trunnion;
   a second securing ring disposed adjacent a turbine housing and in which said guide vanes are each pivotably mounted by means of said second trunnion; and
   an adjusting mechanism for adjusting one of said end limits;
   wherein said guide apparatus assembly has an inner diameter which is larger than the outer diameter of said turbine wheel, and
   wherein said first and second securing rings are connected in axially spaced relation to each other by connecting elements to form a flow channel between them with the guide vanes disposed therein.

2. A turbine according to claim 1, wherein said second securing ring is mounted so as to be free of contact with said turbine housing.

3. A turbine according to claim 2, wherein a labyrinth seal is provided between said second securing ring and said turbine housing.

4. A turbine according to claim 1, wherein said guide apparatus assembly further comprises a support ring fixedly attached to said first securing ring, and said adjusting mechanism comprises an adjusting ring mounted on said support ring.

5. A turbine according to claim 4, wherein said adjusting ring is provided with a plurality of projections each having a radially inwardly disposed contact surface and a radially outwardly disposed contact surface, and wherein the inwardly disposed contact surface of one projection and the outwardly disposed contact surface of an adjacent projection form adjustable end limits for determining the angle adjustment range for a guide vane.

6. A turbine according to claim 5, wherein said projections with inwardly and outwardly disposed contact surfaces are arranged in spaced relation on an axial end face around the circumference of said adjusting ring.

7. A turbine according to claim 6, wherein the axial width of flow channels between the projections is substantially constant.

8. A turbine according to claim 5, wherein at least the free end of each of said guide vanes is bent back radially inwardly along a longitudinal side of the guide vane which faces toward the adjusting ring.

9. A turbine according to claim 1, wherein a portion of said bearing housing is provided with a cooling channel disposed radially inwardly of said assembly.

10. A turbine according to claim 1, wherein said turbine housing is attached through said assembly to said bearing housing.

11. A turbine according to claim 1, wherein said first and second securing rings are connected to each other by screws and spacer sleeves which are arranged in the flow channel between the securing rings.

12. A turbine according to claim 4, wherein said support ring carries a bracket for mounting an adjusting motor of said adjusting mechanism.

13. A turbine according to claim 12, wherein said bracket is integral with said support ring.

14. A turbine according to claim 4, wherein said adjusting ring has a stepped cross sectional configuration.

15. A turbine according to claim 4, wherein said adjusting ring is mounted on said support ring by roller bearings.

16. A turbine according to claim 4, wherein said adjusting ring is mounted on said support ring by slide bearings.

17. A turbine according to claim 4, wherein said adjusting mechanism comprises at least one lever which extends into a recess in said adjusting ring.

18. A turbine according to claim 4, wherein said adjusting mechanism comprises a slide lever received in a recess in said adjusting ring which connects said adjusting ring to the rest of said adjusting mechanism.

19. A turbine according to claim 17, wherein said adjusting mechanism comprises a shaft arranged parallel to said rotor axis and mounted in said support ring, and wherein said shaft is fixedly secured to said at least one lever so that said lever moves when said shaft rotates.

20. An exhaust gas turbocharger comprising a turbine according to claim 1.

21. A turbine according to claim 1, wherein said second securing ring is received within an annular recess in a wall of said turbine housing.

22. A turbine according to claim 21, wherein a surface of said second securing ring facing said guide vanes merges with a wall of said turbine housing, and said turbine housing wall curves away from said guide vanes toward a central turbine outlet opening.

23. A turbine according to claim 1, wherein said second securing ring is provided with circumferentially spaced bores, each of which is aligned with an oppositely disposed bore in said first securing ring, and said second trunnion of each guide vane is rotatably received in a bore of said second securing ring while the first trunnion of that guide vane is rotatably received in the aligned bore of said first support ring.

* * * * *